United States Patent [19]
Lamb et al.

[11] Patent Number: 5,419,415
[45] Date of Patent: May 30, 1995

[54] APPARATUS FOR MONITORING ELEVATOR BRAKES

[75] Inventors: Miles P. Lamb, Chester; Matthew Martin, Randolph, both of N.J.

[73] Assignee: Inventio AG, Hergiswil, Switzerland

[21] Appl. No.: 993,683

[22] Filed: Dec. 21, 1992

[51] Int. Cl.[6] .............................................. F16D 66/00
[52] U.S. Cl. .................... 188/1.11; 116/208; 192/30 W; 200/61.44; 200/61.4; 340/454
[58] Field of Search ............. 188/1.11; 116/208; 340/454; 73/121; 192/30 W; 200/61.44, 61.4, 61.42

[56] References Cited

U.S. PATENT DOCUMENTS

| | | | |
|---|---|---|---|
| 3,454,925 | 7/1969 | Ruof | 340/57 |
| 4,004,269 | 1/1977 | Arai et al. | 188/1.11 X |
| 4,685,540 | 8/1987 | Rath et al. | 188/1.11 |

FOREIGN PATENT DOCUMENTS

| | | |
|---|---|---|
| 0002376 | 6/1979 | European Pat. Off. |
| 0145324 | 6/1985 | European Pat. Off. |
| 0174746 | 3/1986 | European Pat. Off. |
| 0337919 | 10/1989 | European Pat. Off. |
| 0502282 | 9/1992 | European Pat. Off. |
| 3007887 | 9/1981 | Germany |

*Primary Examiner*—Robert J. Oberleitner
*Assistant Examiner*—Lee W. Young
*Attorney, Agent, or Firm*—Howard & Howard

[57] ABSTRACT

An apparatus for monitoring an elevator brake includes at least one sensor and a monitoring circuit. The elevator brake has a rotating brake drum upon which a pair of brake shoes are pressed during braking. The sensor is embedded in a carrier which is mounted on the brake shoe and extends into a brake lining on the shoe. The sensor has a pair of connecting wires each formed into a generally U-shaped loop extending toward the brake drum. The sensor can be a temperature dependent resistor wherein the temperatures in the brake lining, caused by excessive braking processes, can be detected electrically. The thickness of the brake lining decreases due to wear until the brake drum connects the loops upon braking, whereby the sensor is short-circuited which condition can be detected electrically. In the case of brake lining breaks, an infinite resistance occurs between the connecting wires which can likewise be detected electrically. The sensor is connected to the monitoring circuit which employs a plurality of amplifiers connected to different reference voltage sources to convert the sensor signal into output signals representing brake conditions.

14 Claims, 2 Drawing Sheets

APPARATUS FOR MONITORING ELEVATOR BRAKES

BACKGROUND OF THE INVENTION

The present invention relates generally to elevator brakes and, in particular, to an apparatus for monitoring elevator brake conditions.

In general, brakes operate to convert motion energy into thermal energy. However, elevator brakes are provided solely as holding brakes although they may be applied before the elevator car comes to rest at a floor and when various electrical protective devices are actuated such as in overload/overspeed conditions. If these brakes are heated by excessive braking actions, their holding action can deteriorate. The elevator controller cannot detect the reduced effectiveness of the elevator brake due to overload conditions which occur between two regular visual inspections. Furthermore, the wear of the brake linings depends very much on the use of the elevator, which can vary between two visual inspections. Worn or even broken brake linings will put the elevator out of action prior to the next periodically scheduled visual inspection.

A drawback of the above described elevator installations is that the safety of the passengers is not guaranteed under all conditions. A further drawback is that additional emergency maintenance operations become necessary which worsen the ratio of elevator operation time to down time.

It is here that the present invention offers a remedy. The present invention solves the drawbacks of the known equipment by monitoring the elevator brake and automatically indicating the functional capability of the elevator brake.

SUMMARY OF THE INVENTION

The present invention concerns an apparatus for monitoring the operation of an elevator brake with at least one rotating component, which component is braked or held by brake elements which carry brake linings. The brake elements are moved into contact with the rotating component in the case of a braking or stopping condition of the elevator to act with a braking force on the rotating component.

In an elevator brake having a rotating brake drum, the brake elements are a pair of brake shoes having brake linings which are moved into contact with the outer surface of the brake drum upon braking. One or more sensors each can be embedded in a separate carrier, which carrier can be attached to the brake shoe and extend into an area of brake lining. The sensors each have a pair of connecting wires which are formed into generally U-shaped loops extending toward the rotating brake drum. A monitoring circuit has an input and an output the sensor is electrically connected to the input of the monitoring circuit. The sensor responds to conditions representing normal, minimal brake lining thickness, broken brake lining and excessive temperature by generating a plurality of electrical signals to the monitoring circuit input. The monitoring circuit responds to the electrical signals by generating output signals which represent the conditions of normal, minimal brake lining, broken brake lining and excessive temperature.

The sensor can be a temperature dependent resistor. The monitoring circuit can include a plurality of amplifiers each having a pair of inputs, one of the inputs of each of the amplifiers being connected to the sensor for receiving the plurality of electrical signals and another one of the inputs of each of the amplifiers being connected to a separate reference voltage source. Each of the amplifiers has an output for generating at least one of the output signals.

The advantage achieved by the apparatus according to the present invention is that the conditions of the operating capabilities as well as of the operational breakdowns in the elevator brake can be detected by telemonitoring, whereby the number of "on-the-spot" emergency maintenance operations are reduced to a minimum.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
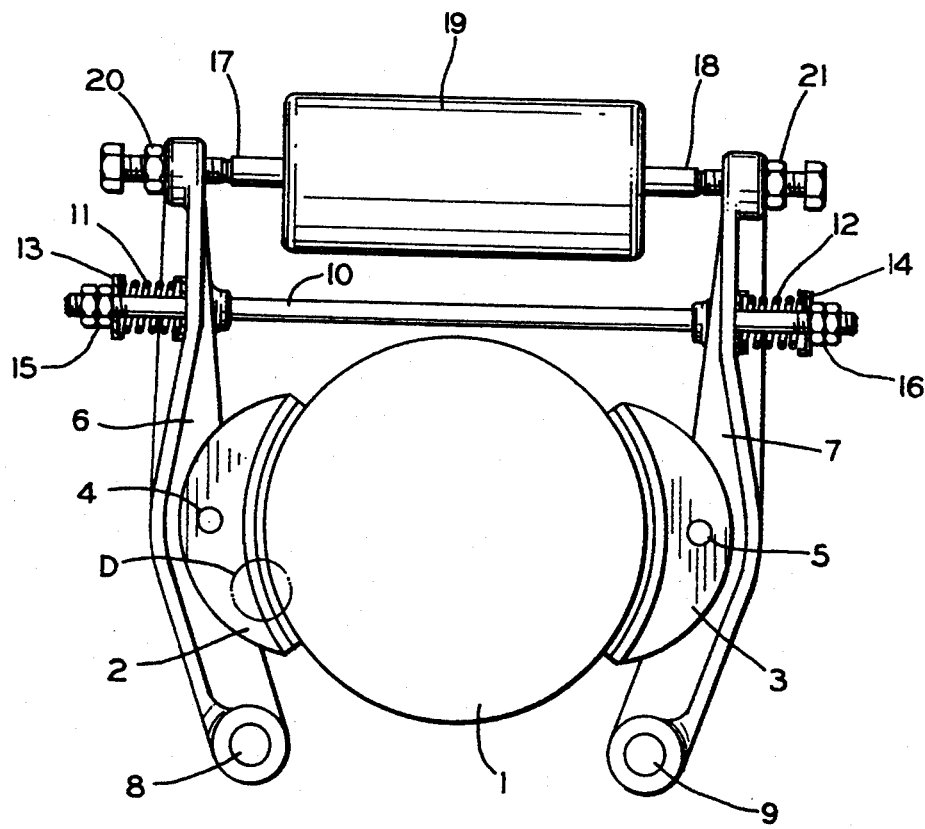
FIG. 1 is a front elevation view of an elevator brake having a monitoring apparatus according to the present invention.
Figure 2:
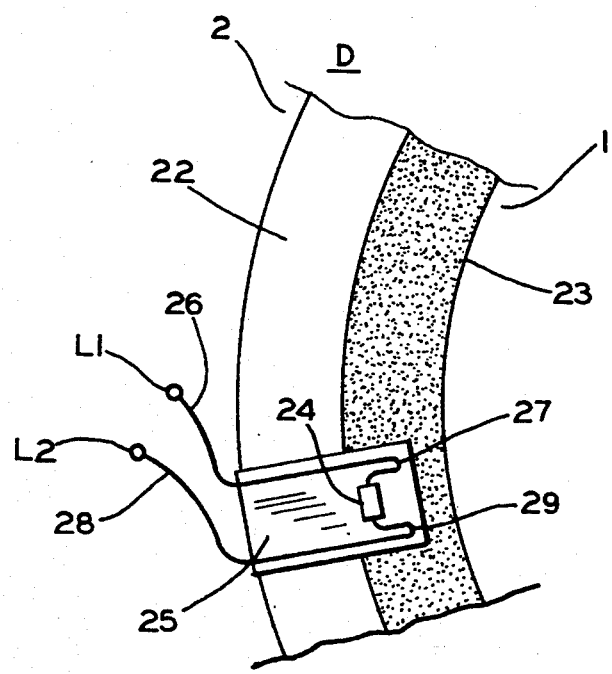
FIG. 2 is an enlarged fragmentary view of a portion of the brake drum shown in the FIG. 1 with a sensor of the monitoring apparatus embedded in the brake lining.

In the FIGS. 1 and 2, there is shown a brake drum 1, connected with a driving pulley (not shown), against which a first brake shoe 2 and an opposed second brake shoe 3 are seated. The shoes 2 and 3 are rotatably attached by a first hinge pin 4 and a second hinge pin 5 respectively to a first brake lever 6 and a second brake lever 7 respectively. The brake levers 6 and 7 extend generally vertically on opposite sides of the brake drum 1 and each have an upper end extending above and a lower end extending below the brake drum 1. The first brake lever 6 is rotatably mounted at its lower end on a first swivel axis 8 and the second brake lever 7 is rotatably mounted at its lower end on a second swivel axis 9.

A tie rod 10 extends horizontally above the brake drum 1 and has opposite ends which extend through the first brake lever 6 and the second brake lever 7. A first compression spring 11 is positioned about a first end of the tie rod 10 between the first brake lever 6 and a first end stop 13. A second compression spring 12 is positioned about a second end of the tie rod 10 between the second brake lever 7 and a second end stop 14. The first end stop 13 is slidable on the tie rod 10 and is retained in a selected position by a first adjusting nut 15 threadably engaging the first end of the tie rod 10. The second end stop 14 also is slidable on the tie rod 10 and is retained in a selected position by a second adjusting nut 16 threadably engaging the second end of the tie rod 10. The nuts 15 and 16 permit adjustment of the compression springs 11 and 12 respectively thereby pressing the brake shoes 2 and 3 more or less against the brake drum 1.

A first actuating bolt 17 extends through the upper end of the first brake lever 6 and a second actuating bolt 18 extends through the upper end of the second brake lever 7. Both actuating bolts 17 and 18 are connected to armatures of an electromagnet 19. When the electromagnet 19 is energized, the bolts are extended outwardly in opposite directions to counteract the spring tension of the compression springs 11 and 12. The lever arms 6 and 7 are pivoted about the axes 8 and 9 respectively so that the brake shoes 2 and 3 are lifted off of and out of contact with the brake drum 1. A third adjusting nut 20 on the upper end of the lever arm 6 threadably engages an end of the bolt 17 and a fourth adjusting nut 21 on the upper end of the lever arm 7 threadably engages an end of the bolt 18 thereby providing the means to adjust disengaged distance between the brake shoes 2 and 3 and the brake drum 1.

Shown in more detail in the FIG. 2 is a section D of the elevator brake presented in the FIG. 1. The first brake shoe 2, identical to the second brake shoe 3, has a generally curved planar brake shoe table 22 on which a brake lining 23 is attached for engagement with the outer surface of the brake drum 1 when the elevator brake is engaged. A sensor 24 is embedded in a carrier 25 which carrier is formed, for example, of a commercial quality resin inserted in the table 22 and extending to the brake lining 23. The sensor 24 has a first connecting wire 26, which is formed in the area of the brake lining 23 into a generally U-shaped first loop 27 extending toward the brake drum 1, and which is connected to a first terminal L1. In a similar manner, the sensor 24 has a second connecting wire 28, which is formed in the area of the brake lining 23 into a generally U-shaped second loop 29 extending toward the brake drum 1, and which is connected to a second terminal L2.

The sensor 24 can be a temperature dependant resistor which detects temperatures in the brake lining 23 such as temperatures lying outside a tolerance limit which are caused by excessive braking processes. In the course of time, the thickness of the brake lining 23 decreases until the brake drum 1, upon braking, connects the first loop 27 with the second loop 29, whereby the sensor 24 is short-circuited. In case the brake lining 23 fractures causing the sensor to break, an infinite resistance is generated between the first terminal L1 and the second terminal L2. The sensor conditions described above can be detected electrically by a monitoring circuit.

Figure 3:
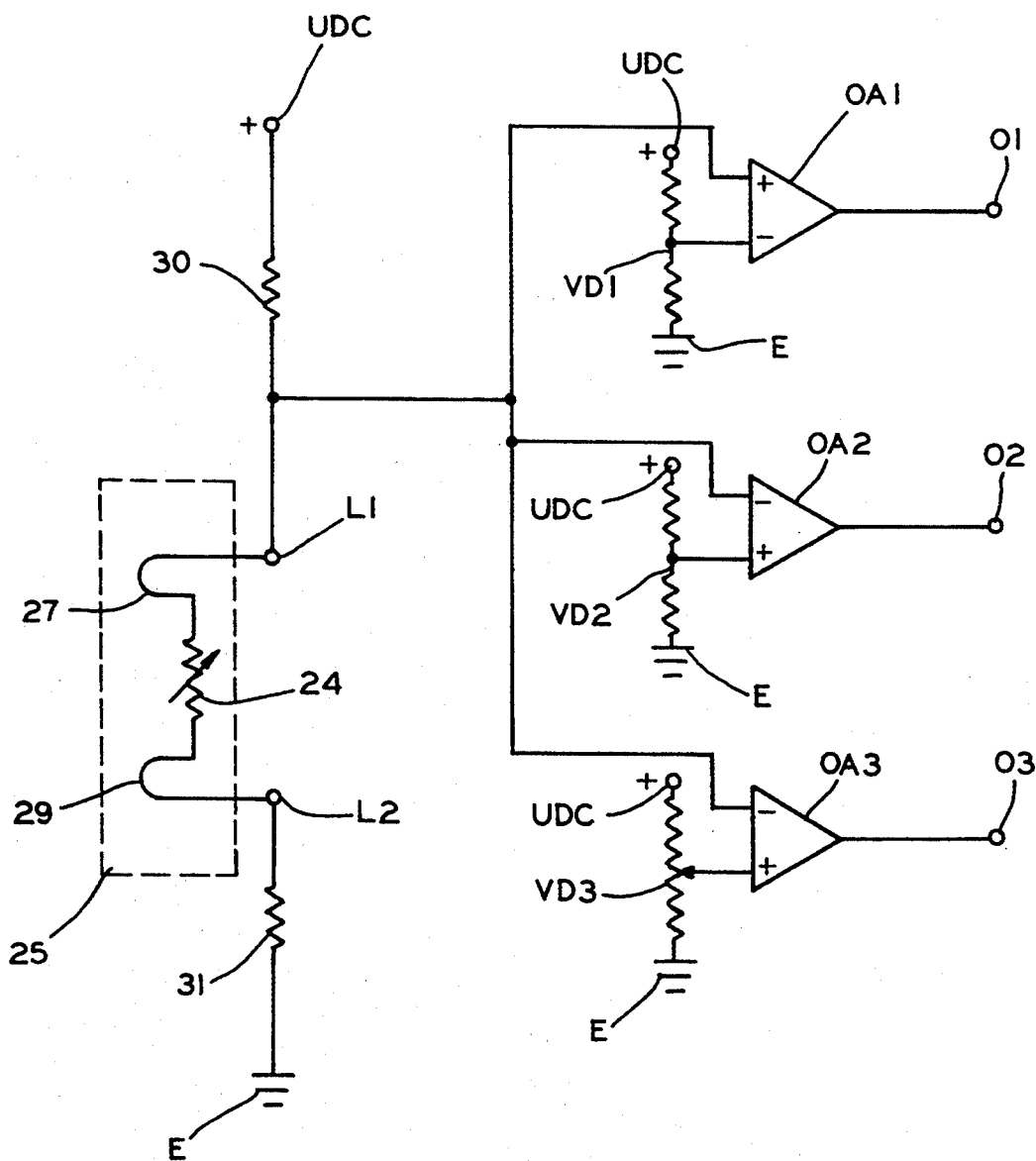
FIG. 3 is a schematic circuit diagram of a circuit of the monitoring apparatus for monitoring the conditions of the operating capability of the elevator brake and generating electrical signals indicating such conditions.

The basic circuit diagram of a monitoring circuit for the conversion of the conditions detected by the sensor 24 of the operational capability of the elevator brake into electrical signals is shown in the FIG. 3. A first resistor 30 is connected at one end to a positive supply voltage UDC and at the other end to the terminal L1. A second resistor 31 is connected on one end with the terminal L2 and on the other end with a circuit ground potential E. The first resistor 30, sensor 24 and the second resistor 31 are thus connected in series and can be of approximately equal resistance values. The first terminal L1 also is connected with a positive (+) or non-inverting input of a first amplifier OA1, with a negative (−) or inverting input of a second amplifier OA2 and with a negative (−) or inverting input of a third amplifier OA3. A fixed first voltage divider VD1 is connected between the supply voltage UDC and the ground E and generates a first reference voltage of approximately one third of the supply voltage UDC at a tap point connected to a negative (−) or inverting input of the first amplifier OA1. A fixed second voltage divider VD2 is connected between the supply voltage UDC and the ground E and generates a second reference voltage at a tap point connected to a positive (+) or non-inverting input of the second amplifier OA2. This voltage is about one volt lower than the magnitude of the supply voltage UDC. A variable third voltage divider VD3 is connected between the supply voltage UDC and the ground E and generates a third reference voltage at a variable tap point connected to a positive (+) or non-inverting input of the amplifier OA3, which reference voltage is adjusted to the temperature dependent operating point of the sensor 24.

A higher magnitude first output signal issuing from a first output O1 of the first amplifier OA1 corresponds to the normal state of operating capability of the elevator brake. A lower magnitude second output signal generated from the first output O1 of the first amplifier OA1 corresponds to a minimum thickness of the brake lining 23. A higher magnitude third output signal generated from a second output O2 of the second amplifier OA2 corresponds to a normal state of operating capability of the elevator brake. A lower magnitude fourth output signal generated from the second output O2 of the second amplifier OA2 corresponds to a broken brake lining 23. A higher magnitude fifth output signal generated from a third output O3 of the third amplifier OA3 corresponds to the normal state of operating capability of the elevator brake. A lower magnitude sixth output signal generated from the third output O3 of the third amplifier OA3 corresponds an excess temperature in the brake lining 23. The signals generated at the first output O1, the second output O2 and the third output O3 are fed for further processing to the elevator control (not shown) and also to telemonitoring equipment (not shown) for remote monitoring.

The above described monitoring apparatus is suitable not only for elevator brakes with brake drums and brake shoes, but it also can be used for the monitoring of elevator brakes with friction disks and brake blocks, or for the monitoring of other types of brake devices.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for monitoring an elevator brake, the elevator brake having at least one rotating component which is braked and held by brake elements with brake linings which linings are pressed into contact with the rotating component, the brake elements being mounted on a brake mechanism which is responsive to an actuating device for moving the brake elements to engage the brake linings with the rotating component with a braking and holding force, comprising:

a carrier adapted to be attached to one of the brake elements and extend into an area of the brake lining on the brake element;

a sensor embedded in said carrier, said sensor including a temperature dependent resistor and a pair of connecting wires, each of said connecting wires having a first end and a second end and being formed into a generally U-shaped loop, said loops extending toward the rotating component when the carrier is attached to the brake element, said temperature dependent resistor being connected in series with said connecting wires between said first ends; and a pair of terminals, said second ends of said connecting wires each being connected to one terminal of said pair of terminals.

2. The apparatus according to claim 1 including a monitoring circuit having an input and an output, wherein one of said terminals is electrically connected to said input of said monitoring circuit, and whereby when said carrier is attached to one of the brake elements and said one of said terminals is connected to a source of electrical power, said connecting wires and said resistor respond to conditions of operating capability of the brake lining on the one brake element representing normal operating capability of the brake lining, minimal thickness of the brake lining, brake lining fracture and excessive temperature in the brake lining by generating at said one of said terminals an associated one of a plurality of electrical signals to said monitoring circuit input, and said monitoring circuit responds to each of said electrical signals by generating a corresponding one of a plurality of output signals at said output, each of said output signals representing an associated one of the conditions of normal operating capability of the brake lining, minimal thickness of the brake lining, brake lining fracture and excessive temperature in the brake lining for the one brake element.

3. The apparatus according to claim 2 wherein said monitoring circuit includes a plurality of amplifiers each having a pair of inputs, one of said inputs of each of said amplifiers being connected to said one of said terminals for receiving said plurality of electrical signals and another one of said inputs of each of said amplifiers each being connected to a separate reference voltage source, each of said amplifiers having an output for generating at least one of said output signals.

4. An apparatus for monitoring an elevator brake, the elevator brake having a rotating brake drum which is braked and held by brake shoes carrying brake linings which linings are pressed into contact with an outside surface of the brake drum, the brake shoes being mounted on a brake mechanism which is responsive to an actuating device for moving the brake shoes to engage the brake linings with the brake drum with a braking and holding force, comprising:

a carrier adapted to be attached to the brake shoe of the elevator brake;

a sensor attached to said carrier for monitoring a plurality of conditions of operating capability of the brake shoe when the brake lining carried on the brake shoe contacts the brake drum of the elevator brake, said sensor including a first connecting wire formed into a generally U-shape, loop and having an end connected to a first terminal, a second connecting wire formed into a generally U-shaped loop and having an end connected to a second terminal and a resistor means connected between said first and second terminals and in series with said connecting wires between said loops; and a monitoring circuit having an input and a plurality of outputs and wherein said first terminal of said sensor is electrically connected to said input of said monitoring circuit, whereby when said carrier is attached to the brake shoe with said sensor positioned adjacent the brake lining and said first terminal is connected to a source of electrical power, said sensor responds to conditions of the brake shoe representing normal operating capability of the brake lining, minimal thickness of the brake lining, brake lining fracture and excessive temperature in the brake lining by generating an associated one of a plurality of electrical signals to said monitoring circuit input, and said monitoring circuit responds to said electrical signals by generating a plurality of output signals at said outputs, each said output signal represent an associated one of the conditions of normal operating capability of the brake lining, minimal thickness of the brake lining, brake lining fracture and excessive temperature in the brake lining for the brake shoe.

5. The apparatus according to claim 4 wherein said sensor is embedded in said carrier and said carrier is formed of a resin material.

6. The apparatus according to claim 4 wherein said loops of said first and second connecting wires extend toward the brake drum when said carrier is attached to the brake shoe, said loops being contacted by the brake drum for short circuiting said resistor means when the brake lining is worn to the minimal thickness and said sensor generating said electrical signal representing the condition of minimal thickness of the brake lining at said first terminal.

7. The apparatus according to claim 4 wherein when said carrier is attached to the brake shoe and the brake lining fractures, at least one of said first and second connecting wires breaks and said sensor generates said electrical signal representing the condition of brake lining fracture at said first terminal.

8. The apparatus according to claim 4 wherein said resistor means is a temperature dependent resistor whereby when said carrier is attached to the brake shoe and said brake lining overheats, said sensor generates said electrical signal representing the condition of excessive temperature in the brake lining at said first terminal.

9. The apparatus according to claim 4 wherein said monitoring circuit includes a plurality of amplifiers each having a pair of inputs, one of said inputs of each of said amplifiers being connected to said first terminal for receiving said plurality of electrical signals and another one of said inputs of each of said amplifiers each being connected to a separate reference voltage source, each of said amplifiers having one of said outputs for generating at least one of said output signals.

10. An apparatus for monitoring an elevator brake, the elevator brake having a rotating brake drum which is braked and held by brake shoes with brake linings which linings are pressed into contact with an outside surface of the brake drum, the brake shoes being mounted on a brake mechanism which is responsive to an actuating device for moving the brake shoes to engage the brake linings with the brake drum with a braking and holding force, comprising:

a carrier adapted to be attached to the brake shoe and extend into an area of the brake lining on the brake shoe;

a sensor on said carrier, said sensor including a pair of connecting wires and a temperature dependent resistor, each said connecting wires being formed into a generally U-shaped loop extending toward the brake drum when said carrier is attached to the brake shoe, said temperature dependent resistor being electrically connected to an end of each of said connecting wires in series between said loops, another end of each of said connecting wires each being connected to an associated one of a pair of terminals; and a monitoring circuit having an input and a plurality of outputs, one of said terminals being electrically connected to said input of said monitoring circuit, whereby when said carrier is attached to the brake shoe and said one of said terminals is connected to a source of electrical power, said wires and said resistor respond to conditions of operating capability of the brake lining representing normal operating capability of the brake lining, minimal thickness of the brake lining, brake lining fracture and excessive temperature in the brake lining by generating an associated one of a plurality of electrical signals to said monitoring circuit input, and said monitoring circuit responds to said electrical signals by generating output signals at said outputs which output signals represent the conditions of normal operating capability of the brake lining, minimal thickness of the brake lining, brake lining fracture and excessive temperature in the brake lining for the brake shoe.

11. The apparatus according to claim 10 wherein said monitoring circuit includes a plurality of amplifiers each having a pair of inputs, one of said inputs of each of said amplifiers being connected to said monitoring circuit input for receiving said plurality of electrical signals and another one of said inputs of each of said amplifiers being connected to a separate reference voltage source, each of said amplifiers having one of said outputs for generating said electrical signal representing normal operating capability of the brake lining and at least another one of said output signals.

12. The apparatus according to claim 11 wherein one of said amplifiers has said another input connected to one of said reference voltage sources having a voltage approximately one third of a voltage of said source of electrical power for generating said output signal representing a minimal thickness of the brake lining.

13. The apparatus according to claim 11 wherein one of said amplifiers has said another input connected to one of said reference voltage sources having a voltage approximately one volt less than a voltage of said source of electrical power for generating said output signal representing a brake lining fracture.

14. The apparatus according to claim 11 wherein one of said amplifiers has said another input connected to one of said reference voltage sources having a voltage approximately equal to an operating point of said temperature dependent resistor for generating said output signal representing an excessive temperature in the brake lining.

* * * * *